United States Patent [19]

Wirsing et al.

[11] Patent Number: 5,647,171
[45] Date of Patent: Jul. 15, 1997

[54] HARD-TOP VEHICLE WINDOW REGULATOR SYSTEM

[75] Inventors: Timothy Alan Wirsing, Saginaw; Alex Newton Draper, Clio, both of Mich.

[73] Assignee: General Motors Corporation, Detroit, Mich.

[21] Appl. No.: 578,415

[22] Filed: Dec. 26, 1995

[51] Int. Cl.⁶ ............................................. B60J 5/04
[52] U.S. Cl. ................................... 49/502; 49/375
[58] Field of Search .................... 49/348, 349, 351, 49/375; 384/411

[56] References Cited

U.S. PATENT DOCUMENTS

| | | | |
|---|---|---|---|
| 3,413,760 | 12/1968 | Gorys et al. | 49/375 |
| 4,937,977 | 7/1990 | Gergoe et al. | 49/375 |
| 5,005,316 | 4/1991 | Hornivius | 49/348 |
| 5,036,621 | 8/1991 | Iwasaki | 49/375 |
| 5,159,781 | 11/1992 | Glossop, Jr. et al. | 49/375 |
| 5,363,595 | 11/1994 | Wirsing | 49/375 |

*Primary Examiner*—Kenneth J. Dorner
*Assistant Examiner*—Curtis Cohen
*Attorney, Agent, or Firm*—Ernest E. Helms; Charles E. Leahy

[57] ABSTRACT

A window regulator system is provided for translating a window. The regulator includes at least one channel extending vertically in the door cavity for guiding the window; a blade connected to the channel and extending parallel to the major axis of the door cavity; a guide block fixed to the window and having a transverse alignment bearing with two generally noncompliant bearing lobes juxtaposed by the blade for aligning the window in a direction transverse to the major axis of the door cavity; and a spring button connected to the guide block and being of a generally hard polymeric material having a generally conical shape with an apex contacting the blade and a base compressed against the guide block for removing transverse compliance of the window within the alignment bearing.

6 Claims, 5 Drawing Sheets

HARD-TOP VEHICLE WINDOW REGULATOR SYSTEM

FIELD OF THE INVENTION

The field of the present invention is that of an automotive vehicle door window regulator system for extendable windows, especially in hard-top or convertible vehicles.

BACKGROUND OF THE INVENTION

There are two major types of vehicle door window arrangements. The first arrangement is that of a sedan-type vehicle door. In the sedan-type vehicle door, the door has a channel that extends above the belt level of the door and encloses a glass window pane when the glass window pane is in its top position. A second type of vehicle door is the hard-top vehicle door wherein the glass, after extending from the belt line of the vehicle door, is totally unsupported above the belt line and mates with the weatherstrip along a door opening of the vehicle. In the hard-top design, the stability of the window glass is totally achieved by its connection with the door below the belt line of the vehicle door. The hard-top vehicle door is also used in convertibles and other vehicle body styles.

Many vehicle doors with extendable windows of the hard-top variety have two parallel channels mounted within the interior of the door. A cross arm (as in Lam et al, U.S. Pat. No. 4,924,627), a cable (as in Dupuy, U.S. Pat. No. 5,067,281) or a tape drive (as in Staran et al, U.S. Pat. No. 4,642,941) regulator mechanism is thereafter attached with the vehicle door. Thereafter, the glass window is attached to the channel members via guide blocks to complete the assembly. The various components are then adjusted to ensure the proper fit of the window and to prevent any possible binding in the up and down movement of the window.

To reduce costs, and in an attempt to prevent alignment problems, it is desirable to allow the channel members and regulator mechanism to be assembled into the vehicle door as one pre-assembled unit with the guide blocks already on the channel members.

In Bisnack et al, U.S. Ser. No. 08/412,813, filed Mar. 29, 1995, a modular window regulator system was presented which allowed virtually complete testing of the regulator system for possible binds before installation into the vehicle door. The window regulator of Bisnack et al greatly diminishes any possible binds due to its unique structure. However, the elimination of possible binds presents a problem with inboard and outboard stability. Inboard and outboard stability (or transverse stability) of the glass is mainly noticeable due to rattling of the window glass when the vehicle door is slammed shut. Previously, stability was added to the system due to the inherent binding which was part of the window regulator system. As mentioned previously, with the window regulator of Bisnack et al, a large amount of the binding is eliminated. Therefore, the binding effect due to slight misalignment of the various portions of the window regulator system may no longer be relied upon for transverse stability of the window glass regulator system.

SUMMARY OF THE INVENTION

The present invention provides a window regulator which has enhanced transverse stability while at the same time providing a minimum of binding for the extension and retraction of the window glass.

DESCRIPTION OF THE PREFERRED EMBODIMENT

Figure 1:
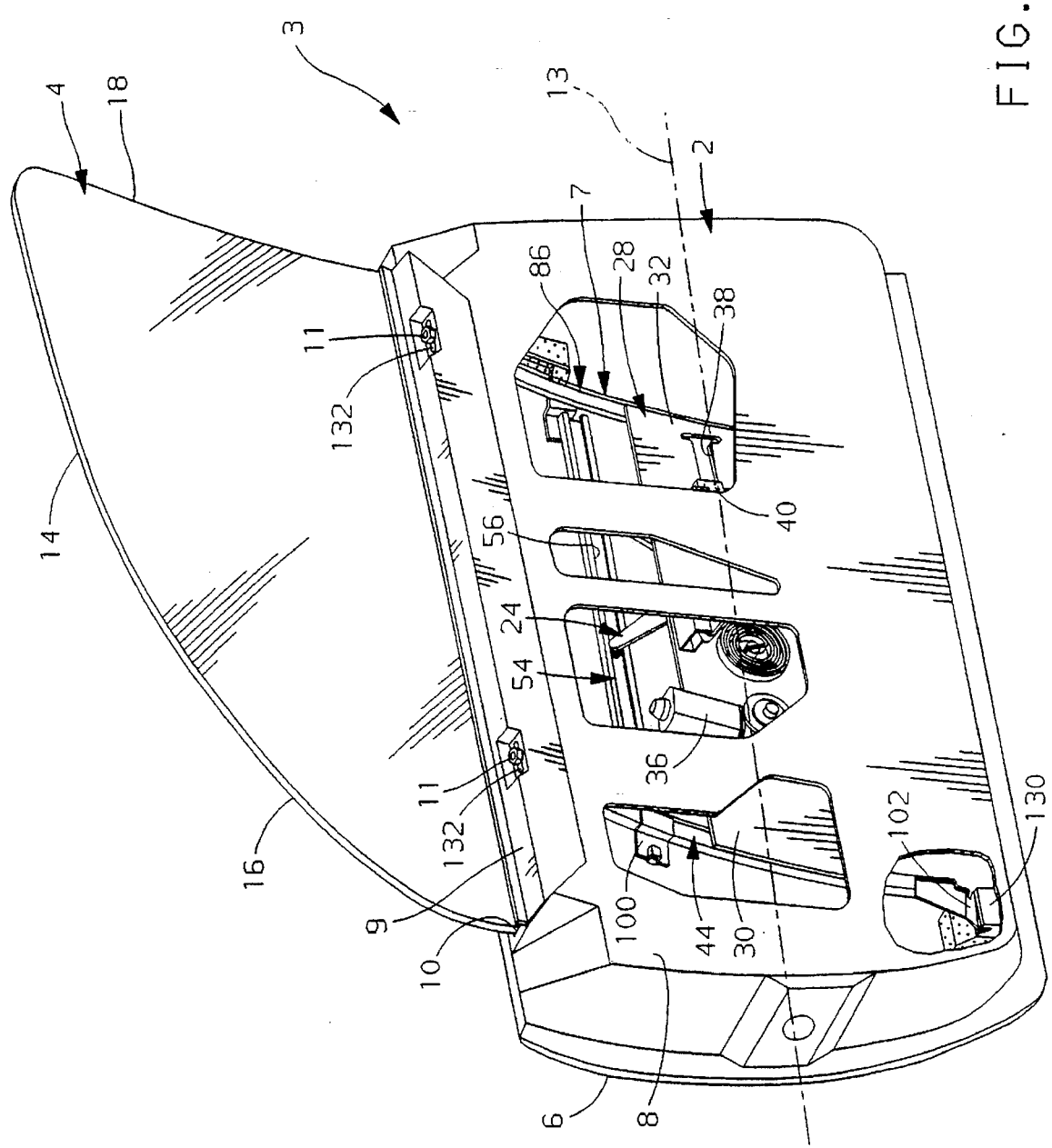
FIG. 1 is a perspective view of a window regulator which utilizes the present invention installed into a vehicle door.
Figure 2:
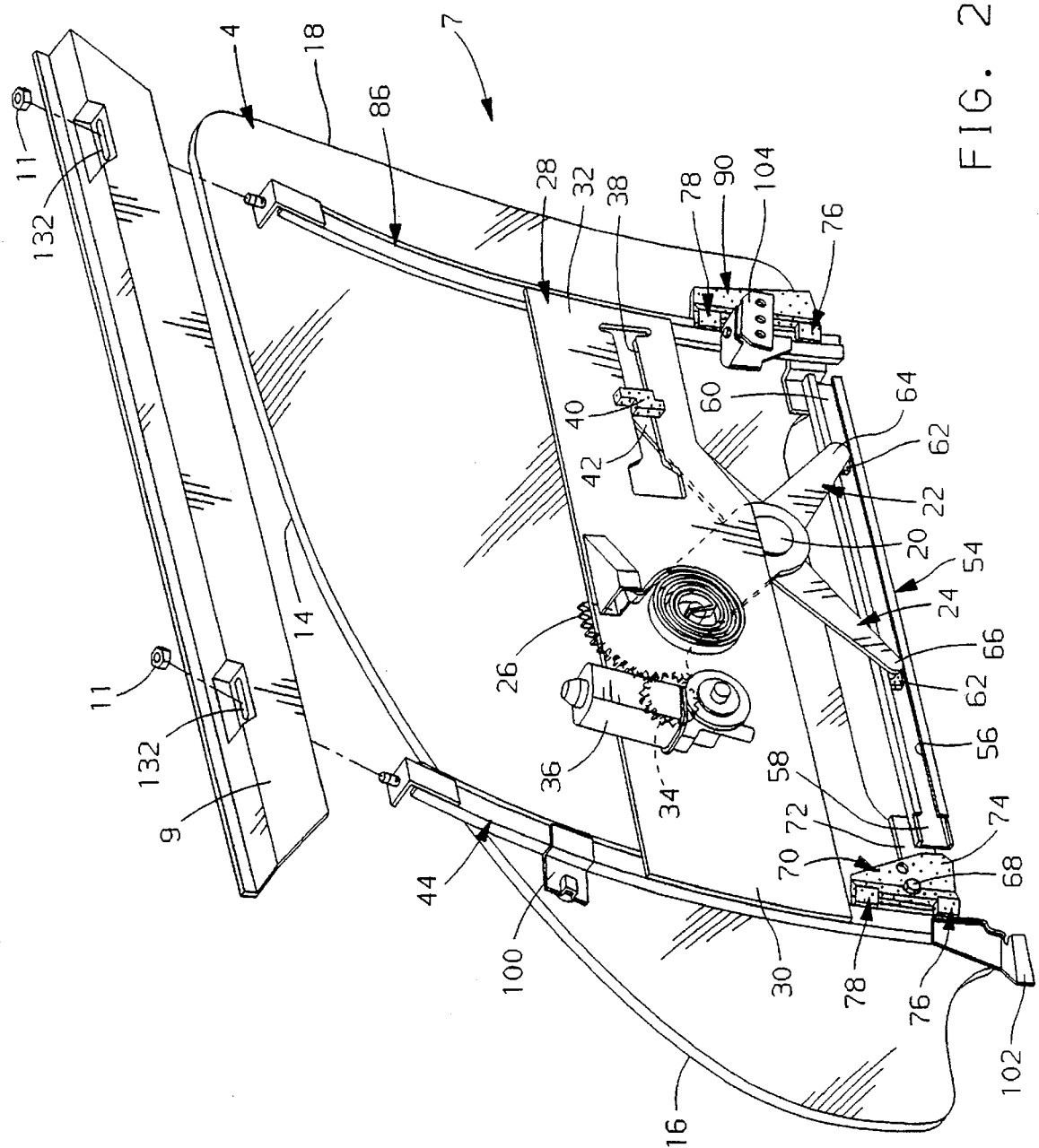
FIG. 2 is a view similar to that of FIG. 1 with the door envelope removed, revealing the inboard side of the window regulator system shown in FIG. 1.

Referring to FIGS. 1 through 8, a hard-top vehicle door 3 utilizing a window regulator system 7 is installed in a door body envelope 2 with an extendable and retractable glass, plastic or other rigid material window pane 4. The door body 2 has an outer panel 6 and an inner panel 8 spaced away from the outer panel 6. The inner panel 8 is capped by a top plate 9 which is joined by fasteners 11. The inner panel 8 and outer panel 6 form a spaced envelope or cavity having a top opening 10 (FIG. 2) and a major axis 13. The top opening 10 is covered by flexible elastomeric seals (not shown). The window 4 extends in and out of the door body 2 via the top opening 10 between the aforementioned seals.

The top edge 14 and side edges 16 and 18 of the glass window pane 4, as mentioned previously, are unsupported by the door 3 and rest against appropriate weatherstripping placed in the door opening (not shown) of a vehicle. Thus, the window regulator system 7 is that of a hard-top vehicle regulator used in hard tops or convertibles. Therefore, stability of the window 4 in the fore and aft direction of the vehicle, the vertical up and down direction of the vehicle, the transverse direction of the vehicle and in a rotational sense of the glass window pane 4 (movement in the plane of the window pane 4) must be achieved by window regulator system 7.

Pivotally joined to each other at point 20 are the first 22 and second 24 cross arm assemblies. The first cross arm assembly 22 has a first end 26 with gear teeth.

A backing plate 28 extends generally in a fore and aft direction with a first end 30 and a second end 32. The backing plate 28 mounts a driver gear 34 (shown in hidden line, FIG. 2, typically toward the outboard side of the backing plate) which is torsionally engaged with the geared tooth end 26 of the first cross arm 22. The drive gear 34 is driven by an electric motor 36 in response to an operator command to translate the window pane 4 in (down) and out (up) of the vehicle door body 2. The backing plate also supports the electric motor 36. Additionally, the backing plate 28 has a linear slot 38 which mounts a polymeric slider 40 which is pivotally connected to the first end 42 of the second cross arm 24.

Figure 3:
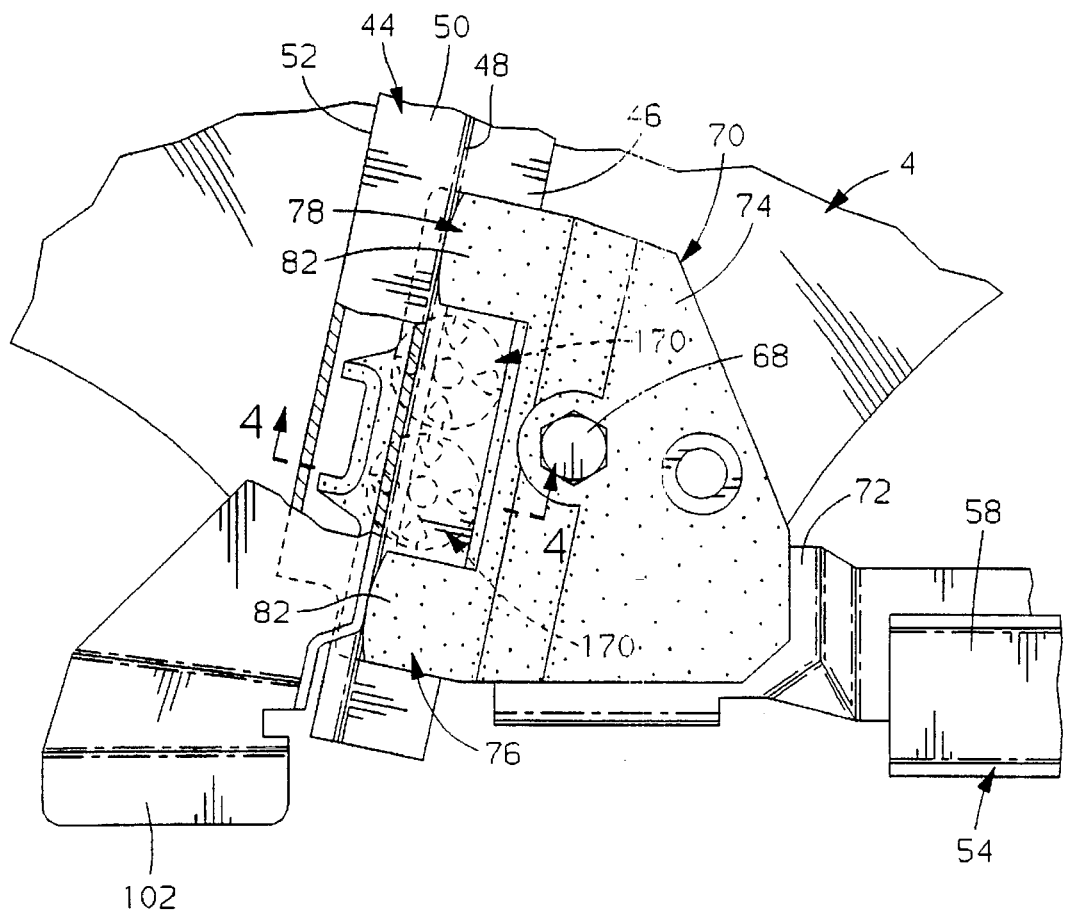
FIG. 3 is an enlarged view of a guide attached to the window glass and sash of the window regulator slidably mounted on a fore channel.
Figure 4:
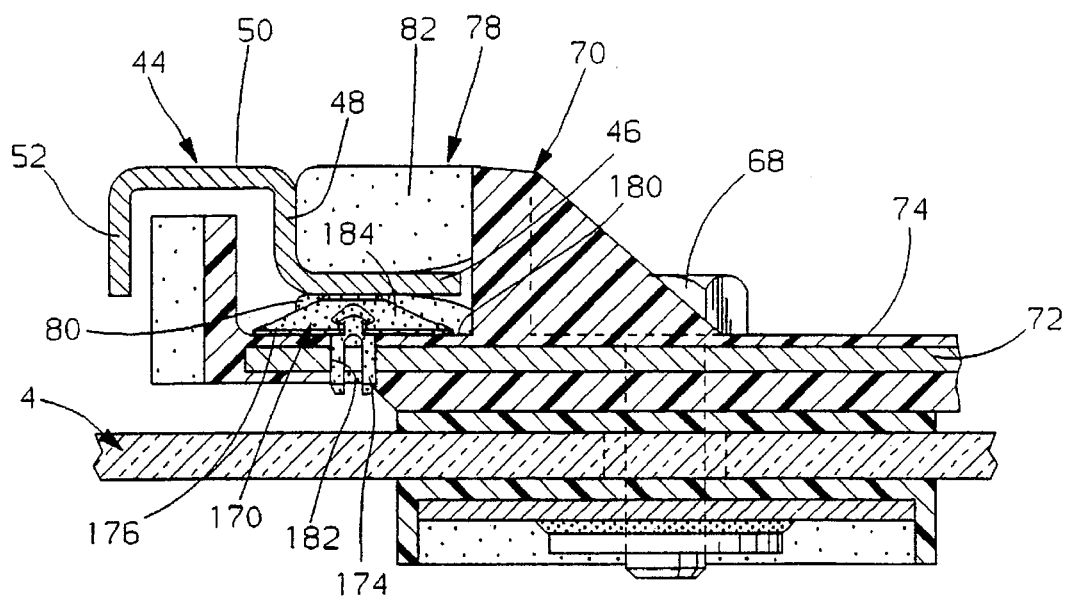
FIG. 4 is a view taken along line 4—4 of FIG. 3.
Figure 5:
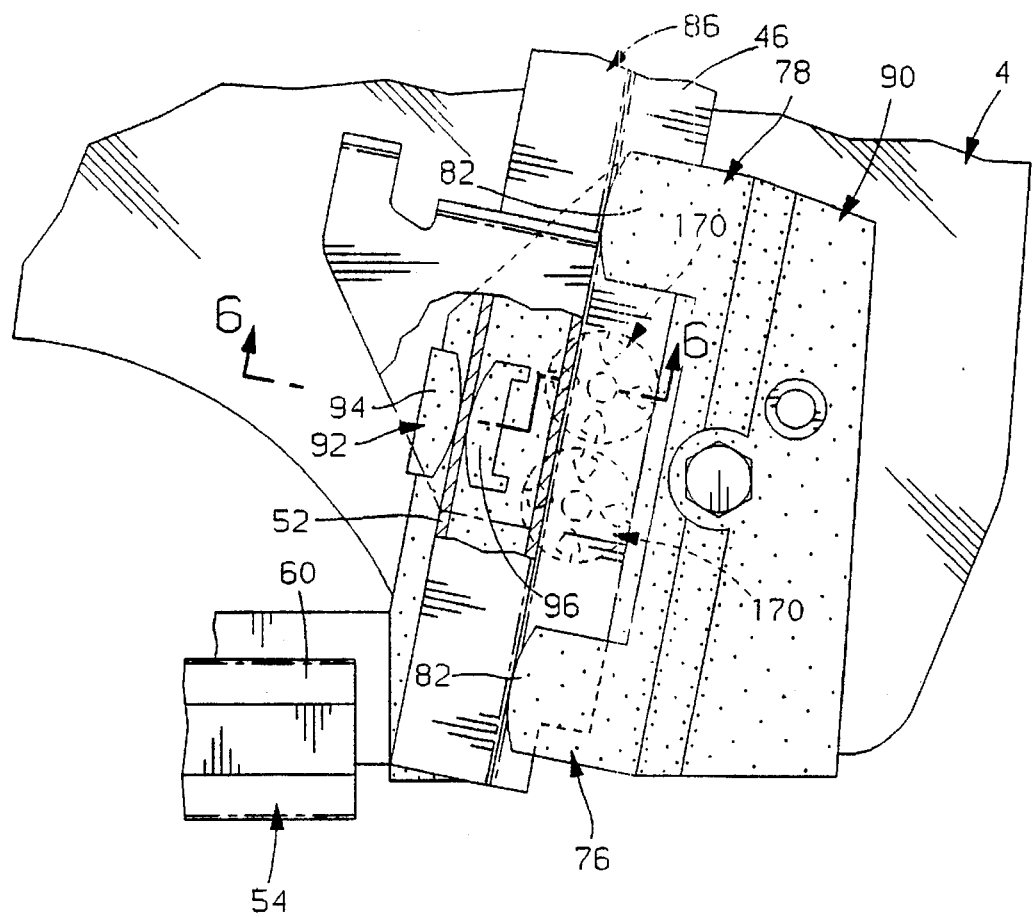
FIG. 5 is a view similar to that of FIG. 3 illustrating the guide slidably mounted on the aft channel.

Fixably connected to the first end 30 of the backing plate is a first channel 44. The first channel 44 extends generally transverse to the backing plate and is oriented generally vertically although slightly inclined. Additionally, the first channel 44 is slightly concave, sloping in an inboard direction as it vertically extends upward, nearly matching the curvature of the window glass 4. Referring additionally to FIGS. 3, 4 and 5, the first channel 44 has a fore and aft flat or blade 46 joined to sides 48 and 50 and a final transverse member or blade 52. The blade 46 is generally parallel to the major axis 13.

The window regulator system 7 also has a sash 54 which is formed by a channel 56 which is typically weldably connected at a first fore end 58 and a second aft end 60. In an alternative embodiment (not shown), the connection may be by bolts or other fasteners. The sash channel 56 via sliders 62 slidably mounts second ends 64, 66 of the first and second cross arms 22, 24, respectively.

Referring to FIGS. 3–6, fixably joined to the window glass 4 and to the first end 58 of the sash 54 by a fastener 68 is a first guide block 70. In the presently shown embodiment, the guide block 70 is directly connected to the window glass 4, but in other embodiments (not shown), the window glass may be fixed to the sash and the sash may be directly connected to the guide block. The guide block 70 is primarily fabricated from a metallic member 72 which is generally integral with the end 58 of the sash 54. The metallic member 72 is encapsulated with a polymeric material 74 which may be nylon, a glass fiber filled nylon or other suitable material such as acetal. The guide block 70 has a lower transverse alignment bearing 76 and an upper transverse alignment bearing 78. Bearings 76 and 78 have generally noncompliant inner lobes 80 and outer lobes 82 which impinge on blade 46 of the channel to provide a vertical bearing which aligns and confines the travel of the glass in the inboard and outboard (transverse) directions.

Figure 6:
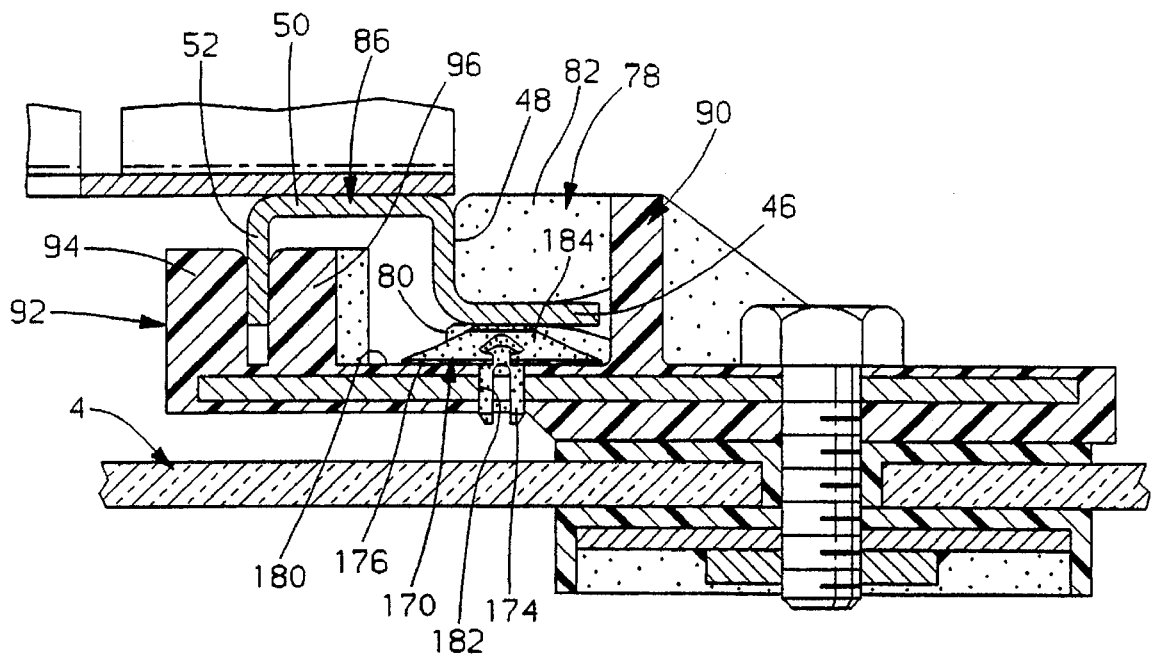
FIG. 6 is a view taken along line 6—6 of FIG. 5.
Figure 7:
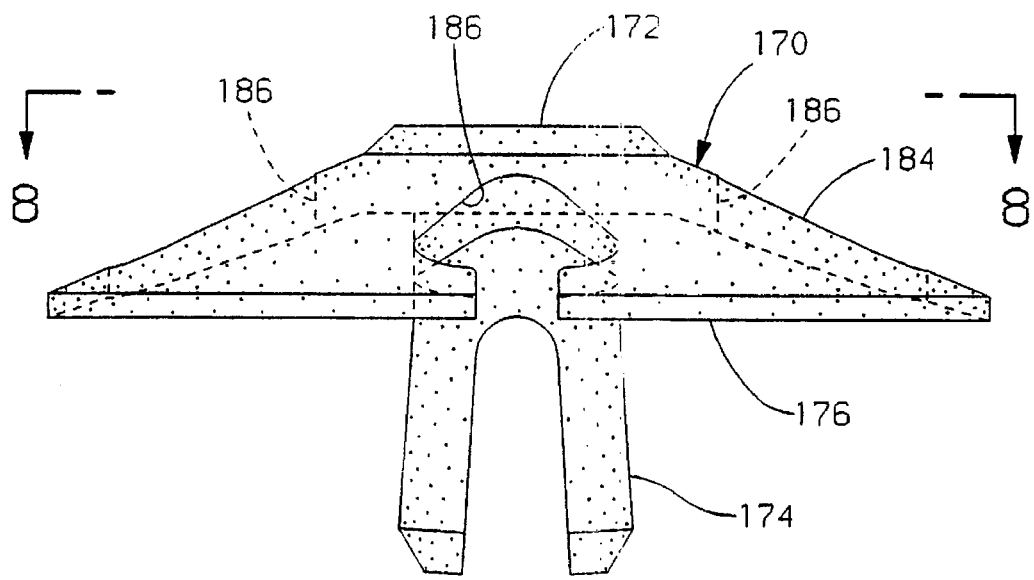
FIG. 7 is an enlarged side elevational view of a button utilized as the transverse stabilizer in the preferred embodiment window regulator according to the present invention.
Figure 8:
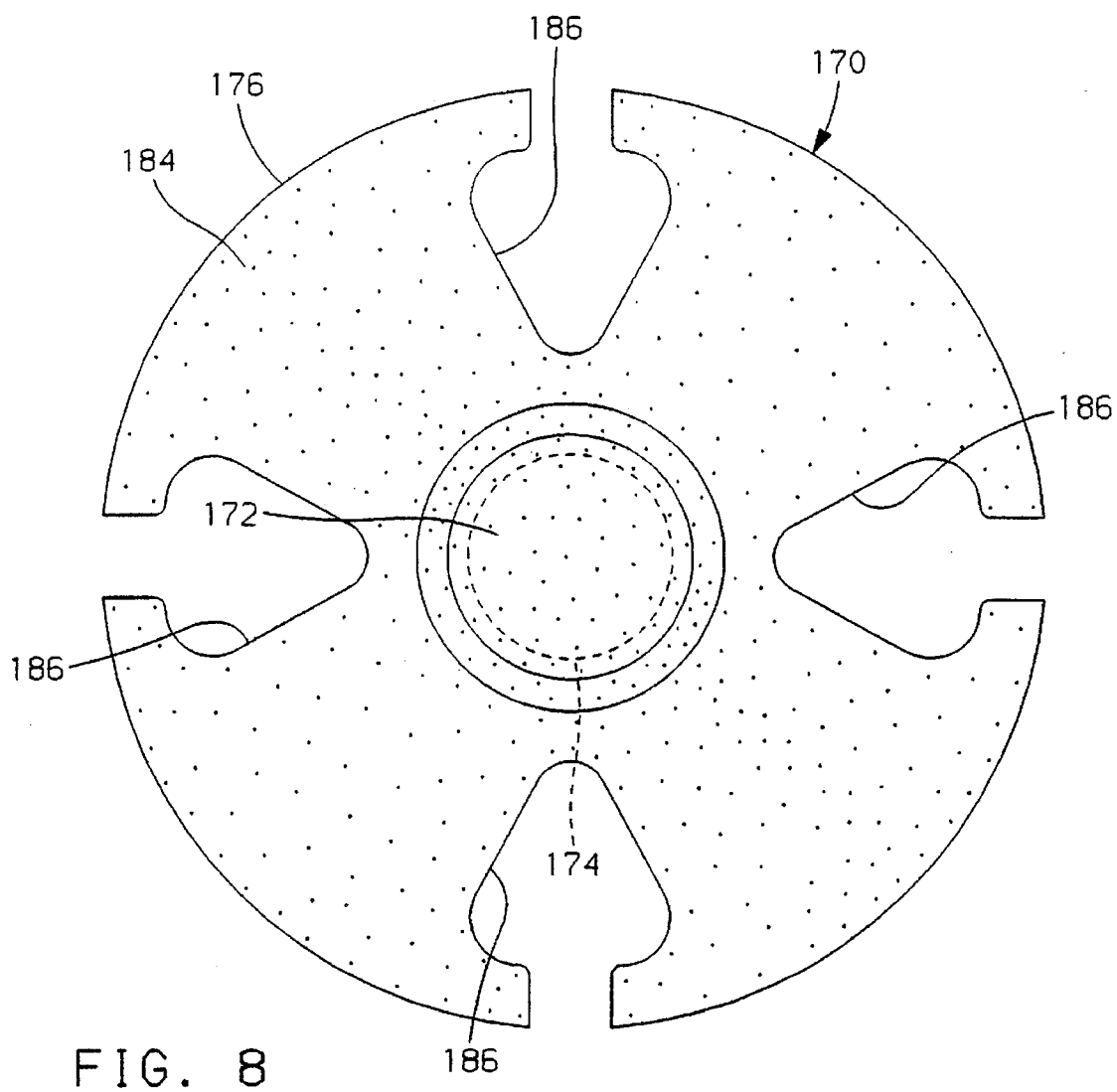
FIG. 8 is a view taken along line 8—8 of FIG. 7.

Referring to FIGS. 6 and 7, connected to the backing plate 28 in a similar fashion to that of the first channel 44 is a rear channel 86. The rear channel 86 has blade 46 and members 52, 50 and 48 in similar fashion to that of the first channel 44. Integrally joined to the second end 60 of the sash 54 and slidably mounted on blade 46 by lower and upper bearings 76 and 78 is a second guide block 90. In a like manner, guide block 90 is connected by welding or a mechanical method similar to fastener 68 to the second end 60 of the sash of glass pane 4. Referring in more detail to FIG. 7, the second guide block 90 has a fore and aft bearing 92 having fore lobe 94 and aft lobe 96 which provide a fore and aft bearing upon blade 52. The fore and aft being 92 sets the fore and aft position of the window glass 4 as the window glass is extended or retracted by the window regulator system 7.

The elevation of bearing 92 should be different than that of the second ends 66 and 64 of the cross arms so that a moment force in the plane of the glass 4 sets up a three-point force resistance between bearing 92 and ends 66 and 64 of the cross arms. Referring back to FIGS. 3 and 4, blade 52 of the first channel 44 has a clearance to ensure that there is only three-point and not four-point support of the window against moment forces, thereby reducing problems of binding which would be inherent with four-point resistance since in order for four-point resistance to work, the tolerance between the parallelism of the blades 52 would have to be far smaller to ensure the elimination of binding forces.

Optionally, the first channel has a glass stabilizer 100 to stabilize the glass for door slam (transverse glass motion) and at its bottom end has a blade 102. Blade 102 is utilized in the installation of the window regulator 7 to the door 3 in a manner described in Wirsing, U.S. Pat. No. 5,430,976 filed Jul. 11, 1995. The rear channel 86 also has fixably attached thereto a bracket 104 which attaches the aft end of the window regulator system 7 to the inner panel 8 if needed in an adjustable fashion. A top plate 9 becomes part of the door body and also fixably connects the top ends of the channels 44 and 86 to one another. An advantage of the window regulator system 7 is that it can be installed as a single unit with the window glass on or off. Additionally, the window regulator system 7 can be tested for any possible binding before installation into the vehicle door 3, as compared to the prior system which required testing after installation since the separate pieces were assembled as separate members into the vehicle door inner panel.

Since the front side edge 16 of the window glass is at an angle, fore and aft adjustment of the regulator system 7 to match the vehicle door opening is critical. The whole regulator system 7 may be adjusted fore and aft due to movement of the blade 102 in the holding fixture 130 as described in aforementioned Wirsing U.S. Pat. No. 5,430,976 and due to slots 132 provided in the top plate 9. The fasteners which connect with bracket 104 are inserted into slots (not shown) of the inner panel 8 to allow for fore and aft adjustment.

Inboard and outboard alignment of the window pane 4 is determined by the juxtaposition of the blade 46 between the inner lobe 80 and the outer lobe 82 of the bearings 76 and 78. A small amount of clearance (approximately 0.20 mm) between the blade 46 and the inner and outer is desirable in order to prevent any binding, however, this clearance provides room for rattling upon door closure. To prevent any possible rattling, there is a spring button 170 to take up the clearance. Spring button 170 has a generally conical shape with an apex 172 and a main body and a stem 174. A base 176 of the button rests on a surface 180 of the guide block 70. The button stem 174 is compliantly held within a hole 182 which is drilled or molded into the guide block 70. The entrapment of the button by the blade 46 prevents the spring button 170 from falling out. The entrapment of the spring button 170 also compliantly loads the spring button 170 to exert a spring force on the blade 46 to take up any slack between the bearing lobes 82 and 80, thereby preventing the rattling which may occur during the closing operation of the door and taking out any lateral or inboard and outboard compliance.

A conical portion 184 of the button has four geometrically spaced triangular shaped cutouts 186 with curved ends to provide for stress relief of the button to prevent stress fractures, thereby enhancing the life of spring button 170. The spring button 170 will typically be made from an acetal plastic material. Referring to FIG. 3, two spring buttons 170 will often be utilized, and the spring buttons 170 will be placed to straddle bearings 76 and 78. In like manner, the spring buttons 170 will be utilized for the rear guide block 90. Since their operation is essentially identical, the explanation will be omitted in the interest of brevity.

Due to its conical shape, the spring button 170 will have a variable spring rate which will increase upon displacement of the blade 46 toward the lobe 80. Therefore, the normal force that the spring button 170 exerts against the blade will only be maximized when needed and will be at a minimum during normal window regulator operation. Also, since the spring button 170 is a plastic material with a low coefficient of friction, very little friction is induced between the spring button 170 and the blade.

While this invention has been described in terms of a preferred embodiment thereof, it will be appreciated that other forms could readily be adapted by one skilled in the art. Accordingly, the scope of this invention is to be considered limited only by the following claims.

What is claimed is:

1. A window regulator system for selectively translating a window in and out of an automotive door cavity, the regulator system comprising:

at least a first channel for extending generally vertically in the door cavity for guiding the window;

a blade connected to the channel, the blade extending in the fore and aft direction;

a guide block fixed with respect to the window, the guide block having a transverse alignment bearing with two generally noncompliant bearing lobes juxtaposed with the blade on opposite sides of the blade for aligning the window in a direction transverse to the window, said lobes are initially spaced from the blade by a small amount of clearance; and a spring button connected to the guide block and being of a generally hard polymeric material having a generally conical shape with an apex contacting the blade and a base compressed against the guide block for exerting a spring force between the blade and the guide block to take up the clearance.

2. A window regulator as described in claim 1 wherein the spring button has a stem fixed within a hole in the guide block.

3. A window regulator as described in claim 2 wherein the spring button stem has a spring compliance within the hole of the guide block.

4. A window regulator as described in claim 2 wherein the spring button is prevented from falling out of the guide block due to its entrapment between the guide block and the blade.

5. A window regulator as described in claim 1 wherein the spring button has cutouts to relieve stresses within the spring button.

6. A window regulator as described in claim 5 wherein the cutouts are triangular and geometrically spaced.

* * * * *